(12) United States Patent
Kusumoto

(10) Patent No.: US 11,435,965 B2
(45) Date of Patent: Sep. 6, 2022

(54) STORAGE MEDIUM STORING PROGRAM FOR CONVERTING FIRST DATA INTO SECOND DATA TO BE INPUTTED TO PRINTER

(71) Applicant: BROTHER KOGYO KABUSHIKI KAISHA, Nagoya (JP)

(72) Inventor: Naoki Kusumoto, Toyohashi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/891,677

(22) Filed: Jun. 3, 2020

(65) Prior Publication Data

US 2020/0394005 A1    Dec. 17, 2020

(30) Foreign Application Priority Data

Jun. 14, 2019  (JP) .............................. JP2019-110889
Jun. 14, 2019  (JP) .............................. JP2019-110890

(51) Int. Cl.
*G06F 3/12*    (2006.01)

(52) U.S. Cl.
CPC .......... *G06F 3/1245* (2013.01); *G06F 3/1206* (2013.01); *G06F 3/1298* (2013.01); *G06F 3/1292* (2013.01)

(58) Field of Classification Search
None
See application file for complete search history.

(56) References Cited

U.S. PATENT DOCUMENTS

2005/0198567 A1\*  9/2005  Vermeulen .............. G06F 40/18
                                                                    709/219
2008/0259398 A1\* 10/2008  Osuka .................... B41J 15/042
                                                                    358/1.15
2018/0165048 A1\*  6/2018  Ikeda ................. H04N 1/00244

FOREIGN PATENT DOCUMENTS

JP            2008-269265 A    11/2008

\* cited by examiner

*Primary Examiner* — Andrew H Lam
(74) *Attorney, Agent, or Firm* — Scully, Scott, Murphy & Presser, PC

(57) ABSTRACT

A non-transitory computer readable storage medium stores a set of program instructions for an information processing apparatus including a processor, a communication interface, and a memory. The set of program instructions, when executed by the processor, causes the information processing apparatus to perform: acquiring type information indicative of a printer type; acquiring first data having a first format; identifying particular information corresponding to the acquired type information based on a conversion correspondence table, the conversion correspondence table showing a correspondence between the type information and the particular information, the particular information identifying at least a structure of data after conversion or a character code type of the data after conversion; converting the first data into second data corresponding to the identified particular information, the second data having a second format to be inputted to the printer; and outputting the second data.

11 Claims, 6 Drawing Sheets

FIG. 2A
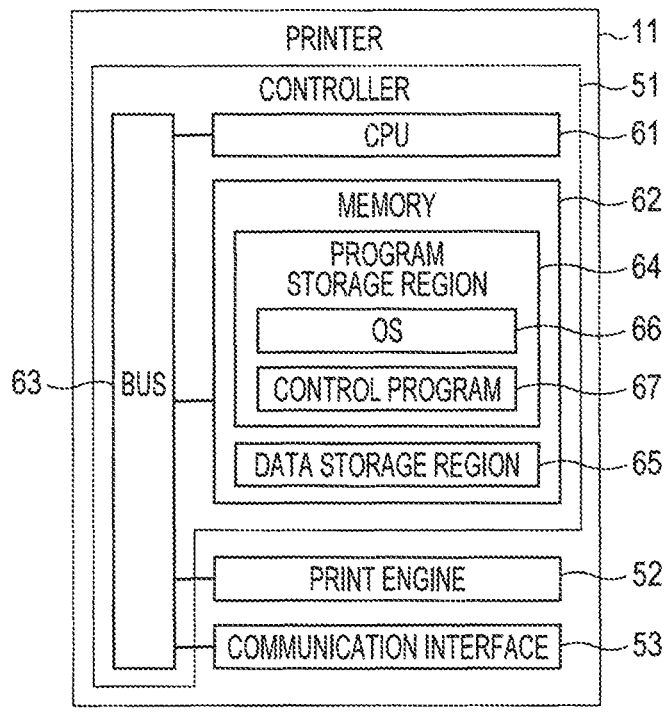
FIG. 2B
CONVERSION CORRESPONDENCE TABLE 46
| MODEL NAME | LOCAL CODE TYPE | ARRANGEMENT TYPE |
|---|---|---|
| A-001 | a01 | k011 |
| A-002 | a02 | k021 |
| B-002 | b01 | k018 |
| ⋮ | ⋮ | ⋮ |
FIG. 2C
DATABASE
| NUMBER | TEXT1 | TEXT2 | TEXT3 |
|---|---|---|---|
| 1 | FIRST FLOOR | AIR CONDITIONING | 200V |
| 2 | FIRST FLOOR | EQUIPMENT | 200V |
| 3 | FIRST FLOOR | GENERAL | 100V |
| ⋮ | ⋮ | ⋮ | ⋮ |
| 11 | SECOND FLOOR | AIR CONDITIONING | 200V |
| 12 | SECOND FLOOR | GENERAL | 100V |
| ⋮ | ⋮ | ⋮ | ⋮ |
FIG. 2D
ARRANGEMENT EXAMPLE OF TEXTS IN LABEL
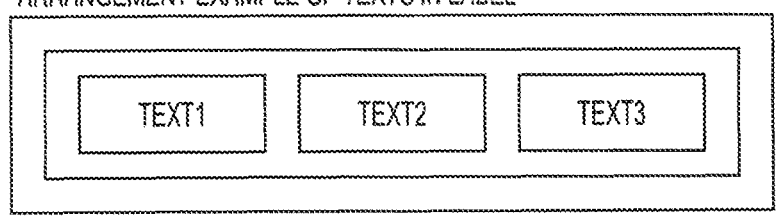

FIG. 5A
ARRANGEMENT POSITIONS IN PD3

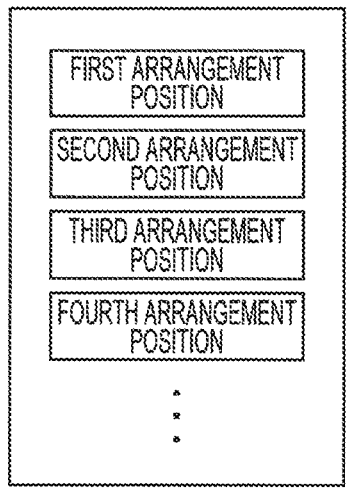

FIG. 5B
DATABASE OF PD3 FORMAT

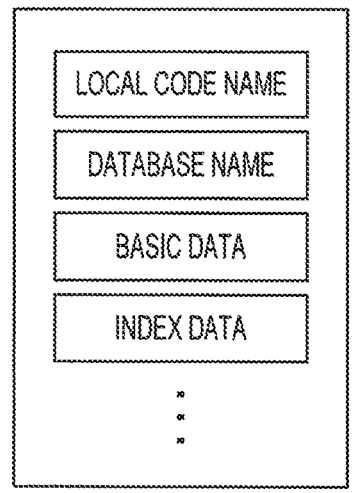

FIG. 5C

ARRANGEMENT TABLE

| ARRANGEMENT TYPE | FIRST ARRANGEMENT POSITION | SECOND ARRANGEMENT POSITION | THIRD ARRANGEMENT POSITION | FOURTH ARRANGEMENT POSITION | ... |
|---|---|---|---|---|---|
| k011 | LOCAL CODE NAME | DATABASE NAME | BASIC DATA | INDEX DATA | ... |
| k021 | INDEX DATA | LOCAL CODE NAME | BASIC DATA | DATABASE NAME | ... |
| k018 | DATABASE NAME | LOCAL CODE NAME | BASIC DATA | INDEX DATA | ... |
| ⋮ | ⋮ | ⋮ | ⋮ | ⋮ | ... |

FIG. 5D
DATABASE OF PARTICULAR FORMAT

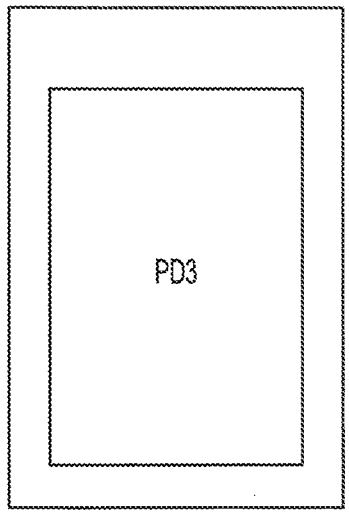

STORAGE MEDIUM STORING PROGRAM FOR CONVERTING FIRST DATA INTO SECOND DATA TO BE INPUTTED TO PRINTER

CROSS REFERENCE TO RELATED APPLICATIONS

This application claims priority from Japanese Patent Application Nos. 2019-110889 and 2019-110890 both filed Jun. 14, 2019. The entire content of each of the priority applications is incorporated herein by reference.

TECHNICAL FIELD

This disclosure relates to a technique for generating data to be inputted to a printer.

BACKGROUND

An application for generating data of a format to be inputted to a printer and inputting the data to the printer is known.

SUMMARY

The form of data such as data structure that can be inputted to a printer and a code type may differ depending on the model of the printer. A technique for generating data of a form corresponding to the type of a model is not disclosed sufficiently.

In view of the foregoing, an aspect of an object of this disclosure is to provide a technique for generating data of a form corresponding to the type of a printer (printer type).

According to one aspect, this specification discloses a non-transitory computer readable storage medium storing a set of program instructions for an information processing apparatus including a processor, a communication interface, and a memory. The set of program instructions, when executed by the processor, causes the information processing apparatus to perform: acquiring type information indicative of a printer type; acquiring first data having a first format; identifying particular information corresponding to the acquired type information based on a conversion correspondence table, the conversion correspondence table showing a correspondence between the type information and the particular information, the particular information identifying at least a structure of data after conversion or a character code type of the data after conversion; converting the first data into second data corresponding to the identified particular information, the second data having a second format to be inputted to the printer; and outputting the second data.

According to another aspect, this specification discloses a non-transitory computer readable storage medium storing a data generation program for an information processing apparatus including a processor, a communication interface, and a memory. The data generation program includes a first module and a second module. The first module, when executed by the processor, causes the information processing apparatus to perform: acquiring type information indicative of a printer type; acquiring first data having a first format; identifying particular information corresponding to the acquired type information based on a conversion correspondence table, the conversion correspondence table showing a correspondence between the type information and the particular information, the particular information identifying at least a structure of data after conversion or a character code type of the data after conversion; converting the first data into second data corresponding to the identified particular information, the second data having a second format to be inputted to the printer; and outputting the second data. The second module, when executed by the processor, causes the information processing apparatus to perform: acquiring original data having a fourth format; calling an API to convert a character code of the original data into a common character code to acquire the first data, the API being provided by an OS of the information processing apparatus; and handing over the acquired first data to the first module.

According to still another aspect, this specification discloses a non-transitory computer readable storage medium storing a first program and a second program for an information processing apparatus including a processor, a communication interface, and a memory. The first program, when executed by the processor, causes the information processing apparatus to perform: acquiring original data of a first format, the original data being written in a first character code; calling an API to convert the first character code of the acquired original data into a second character code, thereby acquiring first data that is the original data written in the second character code; and outputting the first data to the second program. The second program has a conversion correspondence table in which a printer type and a character code type are associated with each other, the character code type being determined from the printer type. The second program, when executed by the processor, causes the information processing apparatus to perform: acquiring the first data outputted by the first program; identifying, as a third character code, a character code indicated by the character code type corresponding to the printer type based on the conversion correspondence table; converting the second character code of the first data into the third character code, thereby generating second data written in the third character code; and outputting the second data.

BRIEF DESCRIPTION OF THE DRAWINGS

Embodiments in accordance with this disclosure will be described in detail with reference to the following figures wherein:

FIG. 2A is a functional block diagram of a printer 11;

FIG. 2B is a diagram showing a conversion correspondence table 48;

FIG. 2C is a diagram showing a database;

FIG. 2D is a diagram showing an arrangement example of texts in a label;

FIG. 5A is a diagram for illustrating arrangement positions of partial data in PD3;

FIG. 5B is a diagram showing the structure of a database of PD3 format;

FIG. 5C is a diagram showing an arrangement table;

FIG. 5D is a diagram showing the structure of a database of a particular format.

DETAILED DESCRIPTION

Figure 1B:
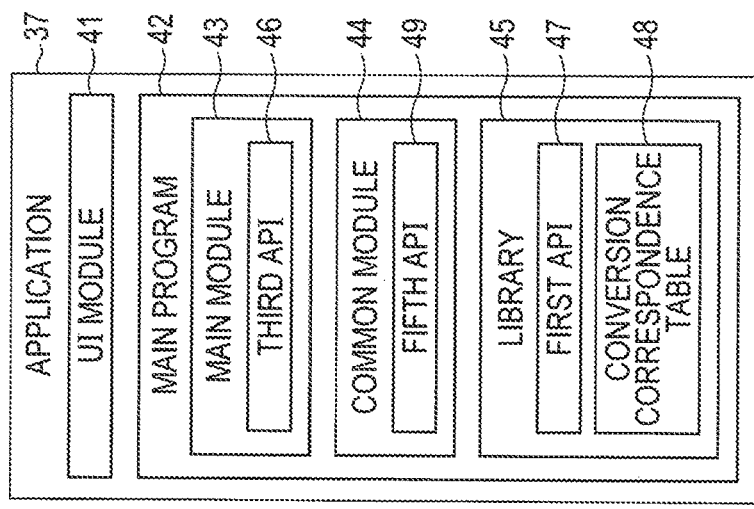
FIG. 1B is a diagram showing the configuration of an application 37.

An aspect of this disclosure will be described while referring to the drawings.

In the present embodiment, an application 37 implemented in an information processing apparatus 10 shown in FIGS. 1A and 1B will be described. The information processing apparatus 10 is a mobile terminal, a tablet, a personal computer, and so on. In the following description, an example in which the information processing apparatus 10 is a mobile terminal will be described. That is, the application 37 implemented in the mobile terminal will be described.

The application 37 is a program for generating print data to be transmitted to the printer 11. The printer 11 is, for example, a label printer that performs printing on a label. However, the printer 11 is not limited to a label printer.

The application 37 has a function of converting image data to generate print data as well as a function of converting a table created by a spreadsheet program to generate data to be inputted to the printer 11. This will be described below in detail.

As shown in FIG. 2A, the printer 11 includes a controller 51, a print engine 52, and a communication interface 53. The print engine 52 includes a conveyance mechanism for conveying a sheet such as a label and a head for printing an image on a conveyed sheet. The head is a thermal head, for example. Alternatively, the head may be a head of an inkjet recording method of ejecting ink droplets, and so on. The communication interface 53 may be connected to the information processing apparatus 10 by using a USB cable, a LAN cable, and so on, or may be connected to the information processing apparatus 10 by wireless connection. The printer 11 performs communication with the information processing apparatus 10 through the communication interface 53.

The controller 51 includes a CPU 61 which is a central processing unit, a memory 62, and a bus 63. For example, the controller 51 is realized by a pattern circuit board and various electronic parts mounted on the pattern circuit board, such as a microcomputer, various ICs, capacitors, and diodes.

The CPU 61, the memory 62, the print engine 52, and the communication interface 53 are connected to the bus 63. That is, the CPU 61 is connected to the memory 62, the print engine 52, and the communication interface 53 through the bus 63.

The CPU 61 executes an OS 66 and a control program 67 described later simulatively in parallel. That is, the OS 66 and the control program 67 are executed by so-called multitask processing.

For example, the memory 62 includes a ROM, a RAM, an EEPROM, a HDD, a buffer in the CPU 61, and so on. The memory 62 has a program storage region 64 and a data storage region 65. The program storage region 64 stores the OS 66 and the control program 67. The data storage region 65 stores information and data. The OS 66 is an operating system.

The control program 67 has a function of inputting, to the print engine 52, print data inputted through the communication interface 53 and controlling the print engine 52 to perform printing. Further, the control program 67 has a function of, by using an inputted database (FIG. 2C), controlling the print engine 52 to print each record of the database on template data of a label shown in FIG. 2D.

More specifically, the data storage region 65 of the memory 62 stores template data of a label including region data indicative of a print region "TEXT1", region data indicative of a print region "TEXT2", and region data indicative of a print region "TEXT3". This template data may be preliminarily stored in the data storage region 65 as default, or may be generated by the application 37 described later or another program and inputted to the printer 11. The database inputted to the printer 11 has a plurality of records and a plurality of items. The plurality of items includes "Number", "TEXT1", "TEXT2", and "TEXT3". A record has various characters inputted to the input field corresponding to each item. In the shown example, in each input field for each item of a record of the number "1", the characters of "First floor", "Air conditioning", and "200V" are inputted.

The control program 67 reads out the record identified by the number "1" from the database, for example. Then, the control program 67 arranges the characters "First floor", "Air conditioning", and "200V" registered in items "TEXT1", "TEXT2", and "TEXT3" of the read record at print regions of "TEXT1", "TEXT2", and "TEXT3" shown in FIG. 2D, respectively, and generates data to be inputted to the print engine 52. Then, the control program 67 inputs the generated data to the print engine 52 and controls the print engine 52 to perform printing on a label. For example, the control program 67 reads out the records in the order of the numbers and generates data. Alternatively, the control program 67 receives a specification from a user, reads out the record of the number specified by the user from the database, and generates data.

For example, the user of the printer 11 is a person who performs installation or maintenance of electrical equipment of a building. For example, the user creates labels affixed to electric cables used in a building by using the printer 11. The user inputs one database to the printer 11 by using the application 37 of the information processing apparatus 10 described later, and creates a label used for a building. Then, the user inputs another database to the printer 11 by using the application 37, and creates a label used for another building.

Figure 1A:
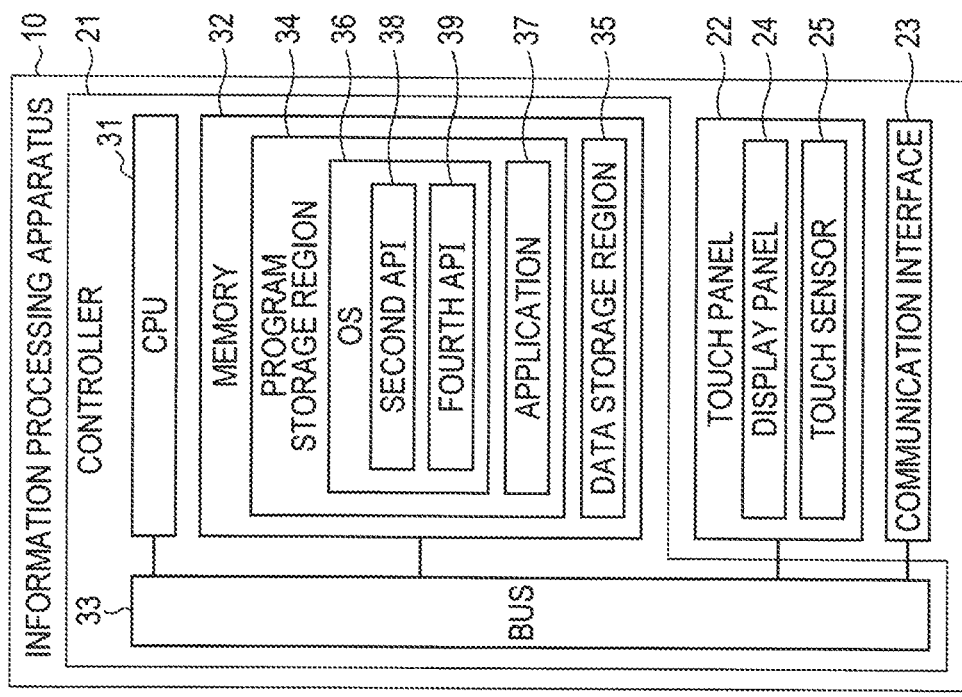
FIG. 1A is a functional block diagram of an information processing apparatus 10.

As shown in FIG. 1A, the information processing apparatus 10 includes a controller 21, a touch panel 22, and a communication interface 23. For example, the communication interface 23 performs communication with the printer 11 by using a communication standard of Wi-Fi™ and Bluetooth™ or by using a communication standard of near-field wireless communication such as NFC.

The touch panel 22 includes a display panel 24 that displays characters and graphics and a transparent-film touch sensor 25 superposed on the display panel 24. The touch sensor 25 outputs positional information indicative of the position on the display panel 24 that is touched by the user. For example, the positional information is expressed as a coordinate (x, y) in x-y plane in which the left-upper end of the display panel 24 is the origin, the rightward direction is the positive direction of the x axis, and the downward direction is the positive direction of the y axis. In response to input of positional information indicative of an icon and so on displayed on the display panel 24 from the touch sensor 25, the UI module 41 described later determines that the icon and so on is selected by the user. By touching the icon and so on, the user inputs characters and numbers in the UI module 41. The information processing apparatus 10 may include a microphone instead of the touch sensor 25 or in addition to the touch sensor 25. The microphone converts voice of the user into audio signals and inputs the audio signals to the controller 21. In a case where the information processing apparatus 10 is a personal computer, instead of the touch sensor 25, a mouse and a keyboard are connected to the information processing apparatus 10.

The controller 21 includes a CPU 31 which is a central processing unit, a memory 32, and a bus 33. The CPU 31 is one example of a computer (processor). The configuration of the controller 21 is substantially the same as the configuration of the controller 51 of the printer 11.

The CPU 31 executes an OS 36, a UI module 41 of the application 37 described later, a main module 43, a common module 44, and a library 45 simulatively in parallel. That is, the OS 36, the UI module 41, the main module 43, the common module 44, and the library 45 are executed by so-called multitask processing. The library 45 is one example of a program, a first module, and a second program. The main module 43 is one example of a second module and a first program. The common module 44 is one example of a third module. The UI module 41 is one example of a fourth module.

The configuration of the memory 32 is substantially the same as the configuration of the memory 62 of the printer 11. The memory 32 has a program storage region 34 that stores the OS 36 and the application 37 and a data storage region 35 that stores information and data.

For example, the OS 36 is Android™ OS, iOS™, WindowsPhone™ BlackBerryOS™, and so on.

The OS 36 includes a DLL (abbreviation of Dynamic Link Library) having a second API (abbreviation of Application Programming Interface) 38 called by the application 37 and includes a DLL having a fourth API 39. The second API 38 is an API for converting a local character code into Unicode. The second API 38 is one example of an API. The fourth API 39 is an API for transmitting data to the printer 11 through the communication interface 23. The details are described later.

As shown in FIG. 1B, the application 37 includes a UI (abbreviation of User Interface) module 41 and a main program 42. That is, the application 37 includes the UI module 41 that receives input of the user and the main program 42 that generates print data and database data to be inputted to the printer 11.

The UI module 41 is designed by the developer of the application 37. The developer of the application 37 designs the UI module 41 depending on the type of the OS 36, such as AndroidOS and iOS. The UI module 41 is written in the same program language by which the OS 36 is written.

For example, the main program 42 is supplied to the developer of the application 37 by the vendor of the printer 11. That is, the main program 42 is a so-called SDK (abbreviation of Software Development Kit). The developer of the application 37 combines the main program 42 supplied by the vendor of the printer 11 with the designed UI module 41 to develop the application 37. The main program 42 is one example of a data generation program.

The main program 42 includes the main module 43, the common module 44, and the library 45. The common module 44 is one example of a third program.

The main module 43 has a third API 46 called by the UI module 41 through the OS 36. The third API 46 is used for the UI module 41 to acquire a file path to the database and the name of the database (hereinafter, referred to as database name). The details are described later.

The common module 44 converts image data into print data. The library 45 converts the form of database data into data of a form that can be inputted to the printer 11. Further, the common module 44 instructs the library 45 to convert data.

The library 45 and the common module 44 are written in C++ program language. Thus, if a program can exchange information and data with a program written in C++, that program can exchange information and data with the library 45 to use the library 45. That is, the common module 44 written in C++ can use the library 45. Note that the program that can exchange information and data with a program written in C++ is a program written in Objective-C and a program having a wrapper such as JNI (abbreviation of Java™ Native Interface). The C++ is one example of a particular language. The Objective-C and Java™ are examples of the language of the OS.

The common module 44 has a fifth API 49 called by the main module 43. The fifth API 49 is used for the common module 44 to acquire a database name, a file path (hereinafter, referred to as first file path), and a model name from the main module 43. The details are described later.

The library 45 has a first API 47 called by the common module 44, and has a conversion correspondence table 48. The first API 47 is used for the library 45 to acquire the database name, the first file path, and the model name from the common module 44. As shown in FIG. 2B, the conversion correspondence table 48 indicates correspondence among a model name, a local code type, and an arrangement type. The library 45 identifies, in the conversion correspondence table 48, the local code type and the arrangement type corresponding to the model name acquired from the main module 43, and generates database data that can be inputted to the printer 11 by using the identified local code type and arrangement type. The details are described later. The model name is one example of type information (printer type) and model information. The conversion correspondence table 48 is one example of a correspondence table. The local code type is one example of a code type.

Hereinafter, processing in which the library 45 generates a database of the form of data that can be inputted to the printer 11 will be described while referring to FIG. 3, FIG. 4, and FIGS. 5A to 5D.

In this specification, basically, the processing of the CPU 31 in accordance with instructions described in the application 37 will be described. That is, the processing such as "judgment", "extraction", "selection", "calculation", "determination", "identification", "acquisition", "reception", "control", and "setting" in the following descriptions indicates processing by the CPU 31. The processing by the CPU 31 includes hardware control through a controller by the OS 36 and so on. The "acquisition" does not need requesting. That is, the idea that "the CPU 31 acquires data" includes processing that the CPU 31 receives data without requesting. Further, "data" in this specification is expressed by a bit array that is readable by a computer. A plurality of data having substantially the same meaning but having different formats is treated as the same data. The same goes for "information" in this specification. The processing such as "instruction", "response", and "request" is executed by communicating information indicative of "instruction", "response", and "request". Further, language such as "instruction", "response", and "request" may be described as information itself indicative of "instruction", "response", and "request".

The processing by the CPU 31 in accordance with instructions described in a program may be described by abbreviated language. For example, the abbreviated language includes "the CPU 31 executes", "the main module 43 executes", "the common module 44 executes", "the library 45 executes", and so on.

The processing, by the CPU 31, of determining whether information A indicates matter B may be conceptually described as "determining whether it is matter B based on information A". The processing, by the CPU 31, of determining whether information A indicates matter B or indicates matter C may be conceptually described as "determining whether it is matter B or matter C based on information A".

Both of "data" and "information" in this specification are a bit or a bit array that can be handled by a computer. The "data" denotes an idea that the content indicated by each bit can be handled without consideration by a computer. In contrast, "information" denotes an idea that processing of a computer branches off depending on the content indicated by each bit. Further, "instruction" is a control signal for prompting an apparatus of the transmission destination to perform the next operation. The "instruction" may include information, or the "instruction" itself may have a property as information.

The above-described classification between "data" and "information" is not strict, and exceptions are allowed. For example, data may be temporarily treated as information, and information may be temporarily treated as data. Further, what is treated as data in a certain apparatus may be treated as information in another apparatus. Further, information may be taken out of data, and data may be taken out of information.

The phrase "in response to" in this specification indicates that, in a case where a condition described after this phrase is satisfied, the corresponding processing is executed. The timing at which the processing is executed need not be necessarily immediately after the condition is satisfied, as long as the timing is after the condition is satisfied.

For example, the application 37 is started up by the OS 36 based on an instruction from the spreadsheet program that has created a database. Or, the application 37 is started up by a startup instruction of the user inputted through the touch sensor 25.

For example, the started main module 43 of the application 37 inputs, to the OS 36, a command for requesting a reply of a list of the printer name and the model name of the printer 11 with which the OS 36 communicates, and acquires the list of the printer name and model name of the printer 11 from the OS 36 (S11). The printer name is information for identifying the printer 11. Then, the main module 43 outputs the acquired list of the printer name and model name of the printer 11 to the touch panel 22 through the OS 36 (S12). The touch panel 22 displays an input screen (not shown) having the list of the printer name and model name of the printer 11 (S13). In addition to the list of the name and model name of the printer 11, this input screen has a text box for receiving an input of a database name, and so on. Note that the input screen for selecting the name and model name of the printer 11 may be different from the input screen for inputting the database name.

The user selects the name and model name of one printer 11 in the input screen, and inputs a database name (S14). The UI module 41 of the application 37 acquires the printer name and model name of the selected printer 11 and the database name (S14). Then, the UI module 41 calls the third API 46 of the main module 43 (S15), and hands over the selected printer name, model name and database name to the main module 43 as arguments of the called third API 46 (S16). The processing of S15, S16 in which the UI module 41 calls the third API 46 and hands over the database name to the main module 43 is one example of calling another API and handing over the original data to the second module. The processing that the main module 43 acquires the printer name in S16 is one example of processing of acquiring output-destination information indicative of the output destination of the second data. The printer name is one example of output-destination information. The processing that the main module 43 acquires the model name of the printer in S16 is one example of processing of acquiring the printer type. Because the local code type and the arrangement type are obtained from the model name of the printer by using the conversion correspondence table 48, the processing of acquiring the model name in S16 is equivalent to acquiring format information indicative of the data format of a database of a particular format shown in FIG. 5D.

The main module 43 inputs a command to the OS 36, and acquires a code type and one of a database file that is the file of the database and a file path indicating the database (S17). The code type indicates the type of the character code used in the database. For example, the character code indicated by the code type is any character code such as JIS, Shift-JIS, ASCII, EBCDIC, Unicode, and EUC. Note that the code type and one of the file path of the database and the database file may be handed over from the OS 36 to the main module 43 at the time of startup of the application 37. In the following example, the main module 43, the common module 44, and the library 45 hand over a database by using a file path.

The database created by the above-described spreadsheet program is a file of CSV (abbreviation of Comma Separated Value) data format, for example. Hereinafter, a database generated by the spreadsheet program as a file of CSV data format will be referred to as a CSV database file. The CSV database file is one example of original data of a fourth format. The processing of S17 in which the main module 43 acquires the CSV database file or the first file path is one example of original data acquisition processing. The JIS, Shift-JIS, ASCII, EBCDIC, Unicode, and EUC are examples of a character code. In S17, the main module 43 may acquire the database file itself instead of acquiring the first file path. The processing of S17 in which the main module 43 acquires the database file or the first file path is one example of first acquisition processing.

The main module 43 calls the second API 38 provided by the OS 36 and corresponding to the code type acquired in S17, and hands over the first file path acquired in S17 to a DLL provided by the OS 36 through the second API 38. That is, the main module 43 instructs the DLL provided by the OS 36 to convert the character code of the CSV database indicated by the first file path into Unicode (S18). This DLL converts the character code of the database indicated by the first file path into Unicode. This DLL hands over the file path of Unicode CSV database which is a CSV database converted into Unicode (hereinafter referred to as a second file path) to the main module 43. Unicode is one example of a common character code and a second character code. The Unicode CSV database is one example of first data. In a case where the CSV database file indicated by the first file path acquired by the main module 43 in S17 is written in Unicode, the processing of S18 is skipped.

The main module 43 acquires the second file path from the above-mentioned DLL provided by the OS 36 (S19). Then, based on the model name and database name acquired in S16 and the second file path acquired in S19, the main module 43, the common module 44, and the library 45 execute data generation processing of a particular format for generating database data that can be inputted to the printer 11 (S20). The data generation processing of the particular format will be described while referring to FIG. 4 and FIGS. 5A to 5D. In S19, the main module 43 may acquire the Unicode database file itself instead of acquiring the second file path. The processing of S19 in which the main module 43 acquires the second file path or the Unicode database file is one example of second acquisition processing.

Figure 4:
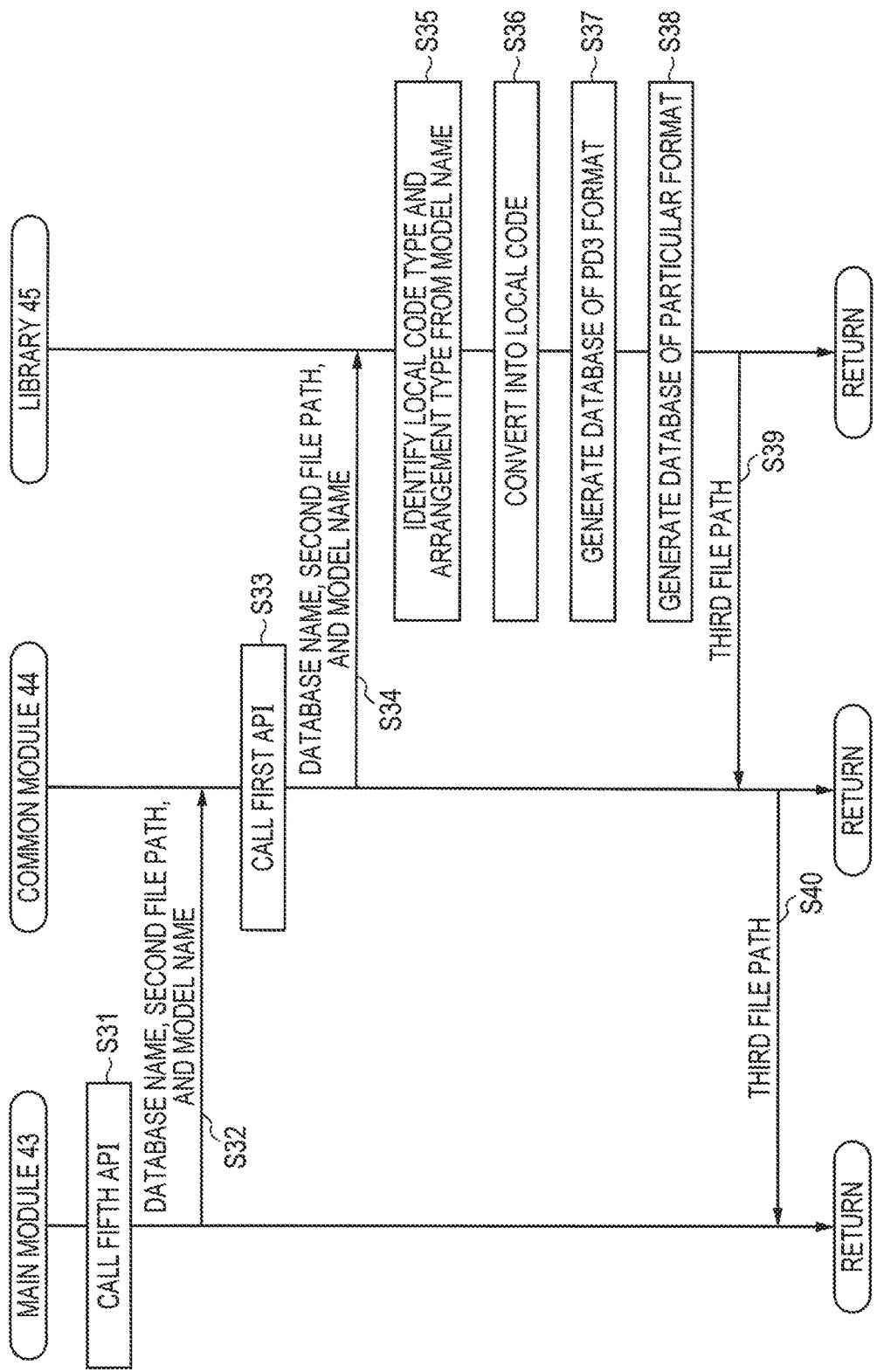
FIG. 4 is a chart for illustrating processing of generating data of a particular format.

As shown in FIG. 4, the main module 43 calls the fifth API 49 of the common module 44 (S31), and hands over the acquired model name, database name, and second file path to the common module 44 (S32).

The common module 44 acquires the model name, the database name, and the second file path as arguments of the fifth API 49 (S32). The common module 44 calls the first API 47 of the library 45 (S33), and hands over the acquired model name, database name, and second file path to the library 45 (S34). The processing of S34 is one example of handover processing. The processing in S32 and S34 in which the main module 43 outputs the acquired second file path to the common module 44 so as to cause the library 45 to acquire the second file path is one example of first output processing. The processing that the main module 43 outputs the acquired model name to the common module 44 so as to output the model name to the library 45 is one example of the processing of outputting the format information to the second program and the processing of causing the second program to acquire the printer type.

The library 45 acquires the model name, the database name, and the second file path as arguments of the first API 47 (S34). The processing of S34 in which the library 45 acquires the second file path is one example of third acquisition processing. The library 45 identifies a local code type and an arrangement type based on the acquired model name and the conversion correspondence table 48 (FIG. 2B) (S35). The local code type is a type of a character code that can be interpreted by a printer of a particular model, and each model has a different local code type. Hereinafter, the character code indicated by the local code type will be referred to as a local code.

The library 45 converts the Unicode CSV database indicated by the acquired second file path into a local code database that is a database written in the character code indicated by the identified local code type (S36). The local code is one example of a character code after conversion. The processing of S34 in which the library 45 acquires the model name is one example of type information acquisition processing. The processing of S34 in which the library 45 acquires the second file path indicative of the Unicode CSV database is one example of data acquisition processing. The Unicode CSV database is one example of the first data of the first format. The above-described arrangement position and local code are one example of particular information. The processing of S35 in which the library 45 identifies the local code and the arrangement position is one example of identification processing. The local code is one example of a third character code. The processing that the library 45 determines the arrangement type in S35 is one example of processing of determining the data format indicated by the format information.

Next, the library 45 generates a database of PD3 data format based on the arrangement type identified in S35 and the arrangement table (FIG. 5C) (S37). The PD3 data format is a data format having, as a header, a command for instructing the printer 11 to perform two-way communication, in addition to basic data that is binary data corresponding to a CSV database. The two-way communication is that, in response to completing reception of a part of data, the control program 67 of the printer 11 requests the information processing apparatus 10 to transmit the remaining part of the data, and thereby the information processing apparatus 10 sequentially transmits, to the printer 11, the data requested by the control program 67 of the printer 11, for example. The PD3 data format is one example of a third format. The database of the PD3 data format is one example of third data.

The processing of S37 in which the library 45 generates a database of the PD3 format will be described while referring to FIGS. 5A to 5D. The data of the PD3 format has basic data that is binary data corresponding to the CSV database, the name of the local code, the database name written in the local code, index data, and so on. Hereinafter, the basic data, the name of the local code, the database name, the index data will be referred to as partial data. The arrangement position of the partial data is one example of the structure of data after conversion.

As shown in FIG. 5A, data of PD3 format is generated by sequentially arranging partial data starting from the first arrangement position. The types of partial data arranged at the arrangement positions such as the first arrangement position, the second arrangement position, the third arrangement position, and the fourth arrangement position in the figure differ depending on the model name of the printer 11. The type of the partial data arranged at each arrangement position is determined by the arrangement table shown in FIG. 5C.

The arrangement table is a table showing the correspondence among the arrangement type, each arrangement position, the type of partial data (in other words, the correspondence between the arrangement type and the type of partial data arranged at each arrangement position). In the illustrating example, the arrangement type "k011", "local code name" at the first arrangement position, "database name" at the second arrangement position, "basic data" at the third arrangement position, and "index data" at the fourth arrangement position are associated with one another.

The library 45 arranges the basic data and the database name included in the local code database, the identified local code name, and the generated index data at the arrangement positions indicated by the arrangement table, thereby generating a database of PD3 format. FIG. 5B shows the database of PD3 format that is generated in a case where the identified arrangement type is "k011".

As shown in FIG. 4, the library 45 generates a database of a particular format based on the database of PD3 format generated in S37 (S38). As shown in FIG. 5D, the particular format is a data format including the database of PD3 format. In addition to the database of PD3 format, the database of the particular format has, as a header, a command indicative of an instruction for inputting data to the printer 11 by one-way communication. That is, the library 45 generates data of the particular format that is inputted to the printer 11 by one-way communication, not the data of PD3 format that is inputted to the printer 11 by two-way communication. For example, the one-way communication is communication in which the information processing apparatus 10 transmits data to the printer 11 without checking with the printer 11.

The processing of S37 in which the library 45 generates the database (binary data) of PD3 format or the processing of S38 in which the library 45 generates the database (binary data) of the particular format is one example of data conversion processing and generation processing. The database (binary data) of PD3 format or the database (binary data) of the particular format is one example of second data of a second format.

The processing of S34 to S38 will be described more specifically. The common module 44 calls a first sub API of the library 45, and hands over the acquired model name to the library 45. The library 45 generates a second sub API based on the handed-over model name. The first sub API and the second sub API are included in the first API 47.

The second sub API is an API indicative of a first class, a second class, and a third class. The first class is a class for converting the Unicode CSV database and the database name into the CSV database and the database name of the local code. The second class is a class for determining the arrangement position based on the above-described arrangement table and arranging the above-described partial data at the determined arrangement position to generate the database of PD3 format. The third class is a class for converting the database of PD3 format into the database of the particular format. The library 45 preliminarily has first classes of the number corresponding to the number of the local code types, one second class, and one third class. The library 45 hands over, to the common module 44, the second sub API indicative of the first class identified based on the handed-over model name, the second class, and the third class.

The common module 44 inputs the acquired database name and second file path to the handed-over second sub API, and generates an instance. The generated instance indicates processing of converting the Unicode CSV database and the database name into the CSV database and the database name of the local code, arranging partial data at the arrangement position identified by the model name to generate a database of PD3 format, and converting the generated database of PD3 format into a database of the particular format. The common module 44 hands over the generated instance to the library 45 (S34).

The library 45 processes the instance that is handed over from the common module 44 (S35 to S38), and generates the database of the particular format (S38). The processing executed based on the instance generated from the second class is one example of processing of arranging a plurality of the partial data at the arrangement positions indicated by the identified particular information. The processing executed based on the instance generated from the third class is one example of processing of converting the arranged data into the second data of the second format. The library 45 processes the instance generated from the class indicated by the second sub API owned by the library 45 itself, and thus reliably processes the instance that is handed over from the common module 44 to generate the database of the particular format.

In the above-described example, the processing of S34 to S38 is executed based on the first sub API, the second sub API, the first class, the second class, and the third class. Alternatively, the processing of S34 to S38 may be executed in a different manner.

As shown in FIG. 4, the library 45 hands over a third file path to the common module 44 as the return value of the first API 47 (S39), and ends the data generation processing of the particular format. The third file path is a file path indicative of the generated database of the particular format. The common module 44 acquires the third file path from the library 45 (S39), hands over the acquired third file path to the main module 43 as the return value of the fifth API 49 (S40), and ends the data generation processing of the particular format. The main module 43 acquires the third file path from the common module 44 (S40), and ends the data generation processing of the particular format. In S39, the library 45 may output the database file itself to the common module 44, instead of handing over the third file path. The processing of S39 in which the library 45 hands over (outputs) the third file path or the data of the particular format to the common module 44 is one example of output processing and second output processing.

Figure 3:
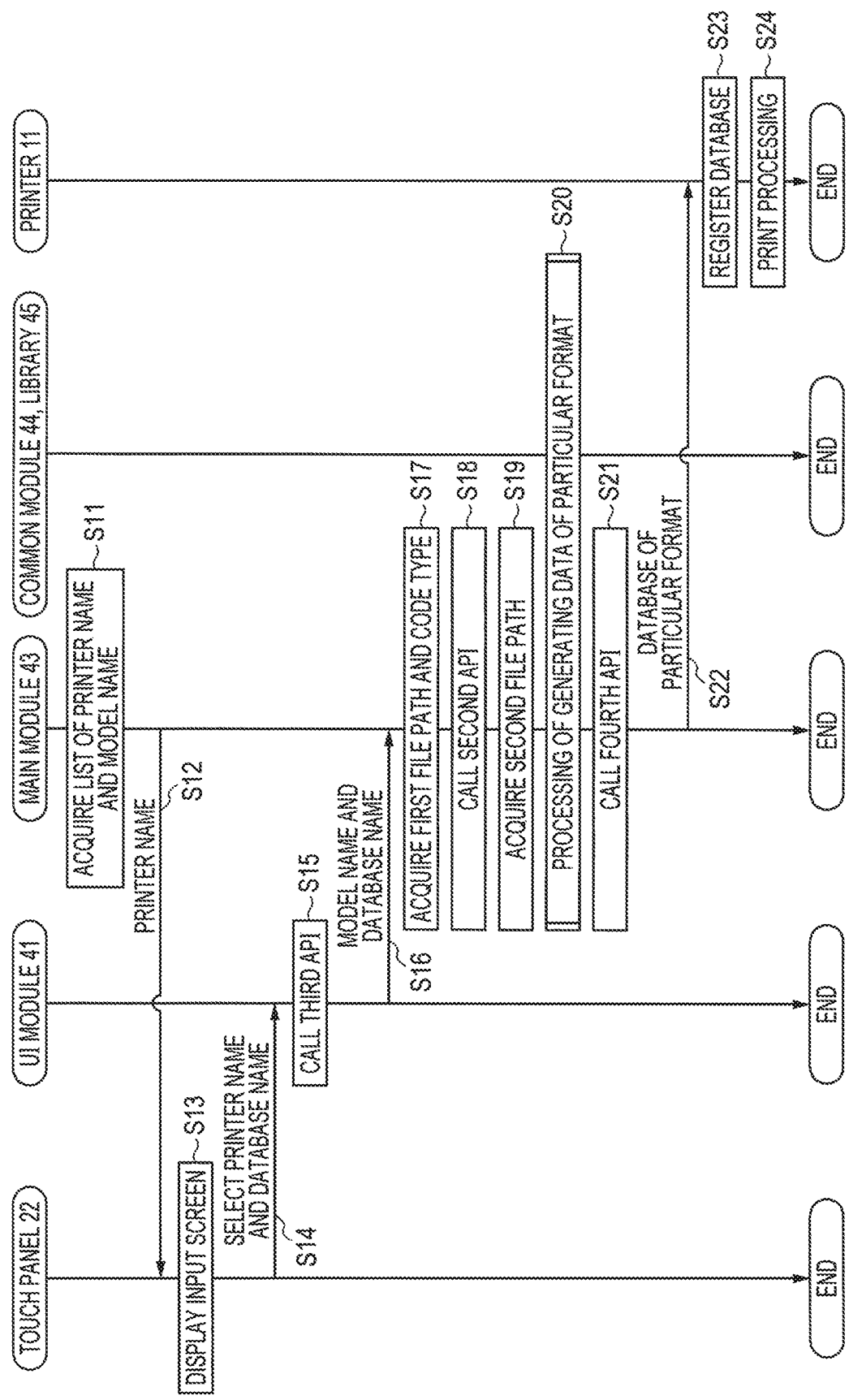
FIG. 3 is a chart for illustrating processing executed by a touch panel 22, a UI module 41, a main module 43, a common module 44, a library 45, and the printer 11.

As shown in FIG. 3, after finishing the data generation processing of the particular format (S20), the main module 43 calls the fourth API 39 (FIG. 1) of a DLL provided by the OS 36 (S21), hands over the third file path to the fourth API 39, and instructs the DLL provided by the OS 36 to transmit, to the printer 11, the database of the particular format indicated by the third file path. The DLL transmits the database of the particular format indicated by the handed-over third file path through the communication interface 23 to the printer 11 by one-way communication (S22).

The control program 67 implemented in the printer 11 receives the database of the particular format through the communication interface 53 (S22). The control program 67 stores and registers the received database of the particular format in the memory 62 of the printer 11 (S23). The control program 67 executes print processing based on the registered database (S24). For example, in response to receiving a print instruction for the number "1" in the database (FIG. 2C), the control program 67 reads out "First Floor", "Air Conditioning", and "200V" from the database, and arranges the read "First Floor", "Air Conditioning", and "200V" at "TEXT1", "TEXT2", and "TEXTS" indicated by the print region data, respectively, thereby generating data to be inputted to the print engine 52. Then, the control program 67 inputs the generated data to the print engine 52, and controls the print engine 52 to print an image on a label.

Figure 6:
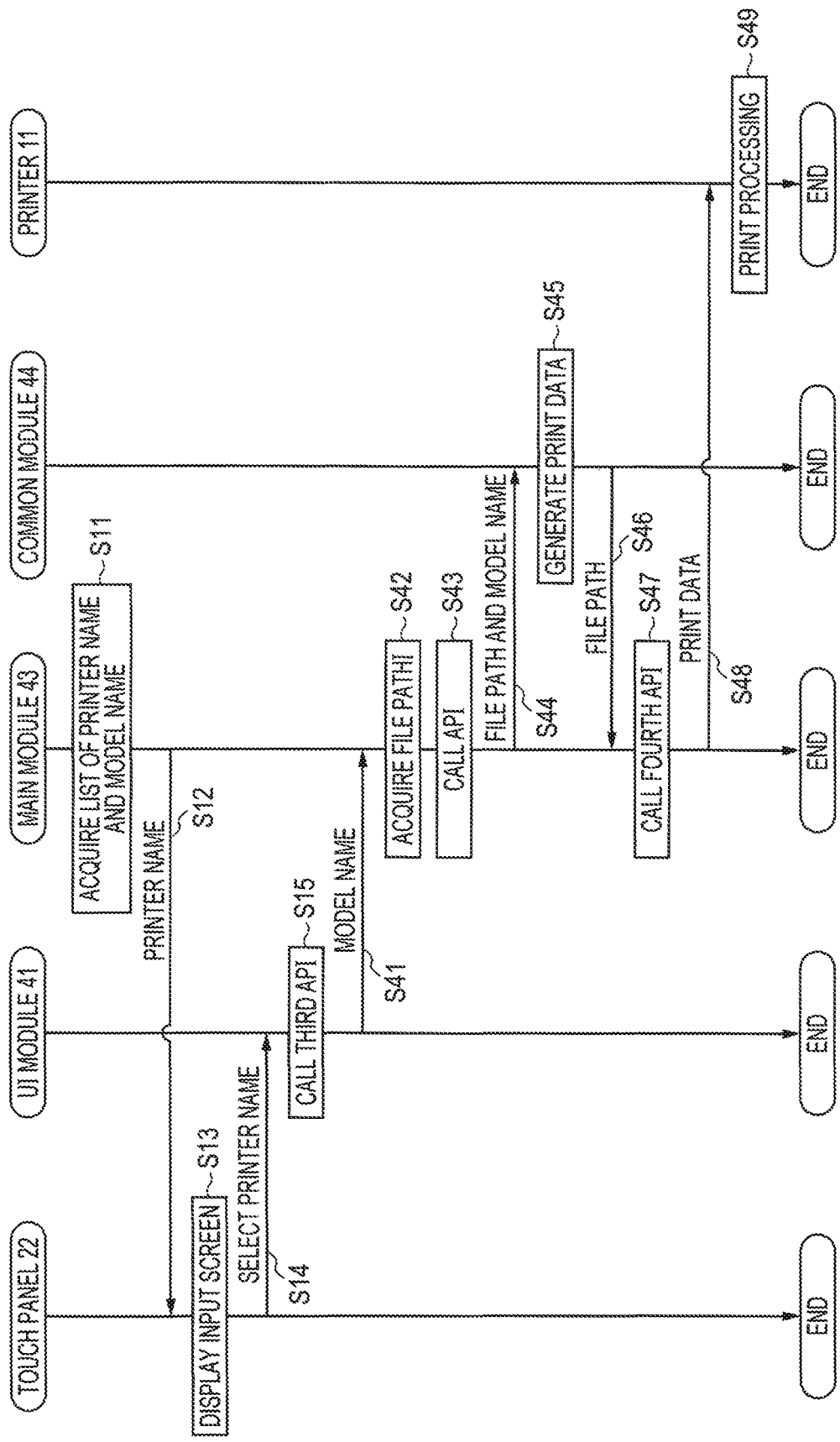
FIG. 6 is a chart for illustrating processing executed by the touch panel 22, the UI module 41, the main module 43, the common module 44, and the printer 11.

Next, another processing will be described while referring to FIG. 6 in which the application 37 converts inputted image data to generate print data, inputs the generated print data to the printer 11, and controls the printer 11 to execute printing. That is, the application 37 is a program for inputting a database to the printer 11 and also for generating print data from the inputted image data and inputting the print data to the printer 11.

For example, the application 37 is started up by the OS 36 by an instruction from the program that has created image data. Alternatively, the application 37 may be started up by a startup instruction by the user. The main module 43 of the started application 37 executes the processing of the above-described S11 to S15 to acquire the model name of the printer 11 (S41). Further, the main module 43 acquires the file path of image data from the OS 36 (S42).

The main module 43 calls API (not shown) owned by the common module 44 (S43), and hands over the acquired model name and file path of the image data to the common module 44 (S44).

The common module 44 acquires the model name and the file path from the main module 43 (S44). The common module 44 generates print data based on the acquired model name and image data indicated by the acquired file path (S45). The common module 44 generates print data by using a known technique, for example. The common module 44 hands over the file path of the generated print data to the main module 43 as the return value of the above-described API (S46).

The main module 43 calls the fourth API 39 of the DLL provided by the OS 36 (S47), and hands over the file path of print data to the DLL. The DLL transmits the print data indicated by the file path to the printer 11 through the communication interface 23 (S48).

The control program 67 implemented in the printer 11 receives the print data through the communication interface 53 (S48). The control program 67 inputs the received print data to the print engine 52, and controls the print engine 52 to print the image indicated by the print data on a label (S49).

Operations and Effects of the Embodiment

The library 45 identifies, based on the conversion correspondence table 48, the character code of the local code type and the arrangement position (the data structure) corresponding to the acquired model name. Then, based on the identified character code and arrangement position, the library 45 converts a Unicode CSV database into a database of the particular format of the identified local code. Accordingly, the library 45 generates the database of the data form that can be inputted to the printer 11, depending on the model (type) of the printer 11.

The main module 43 acquires the file path of Unicode CSV database which is obtained by converting the character code of the acquired CSV database into Unicode (S19), and hands over the acquired file path to the library 45 through the common module 44. That is, the library 45 acquires the CSV database written in Unicode, not CSV databases written in various character codes. Then, the library 45 converts Unicode of the CSV database into a local code that is the character code corresponding to the model name of the printer 11, thereby generating a database of PD3 format or a database of a particular format (S37, S38). Thus, compared with a case where the library 45 acquires CSV databases written in various character codes, the database of PD3 format or the database of the particular format can be generated easily. As a result, the main module 43 and the library 45 easily generate the second data of the type corresponding to the model of the printer.

Further, the library 45 has a table in which the model names and the arrangement positions are associated with each other. Thus, it is possible to generate a database of PD3 data format in which the arrangement positions of partial data are different depending on the model of the printer 11.

Further, the library 45 includes the second sub API having one second class and one third class, the one second class being for generating an instance that arranges partial data at the identified arrangement position and generates a database of PD3 format, the one third class being for generating an instance that converts the generated database of PD3 format into a database of the particular format. Accordingly, compared with a case where the library 45 is provided with an API that generates the database of PD3 format for each printer type and that converts the generated database of PD3 format into the database of the particular format, the number of classes owned by the library 45 can be reduced. As a result, the library 45 is simplified, and the application 37 that can be implemented in mobile terminals is realized.

Further, the library 45 includes the first class for generating an instance that converts Unicode into the character code of local code type corresponding to the model of the printer 11. Then, the library 45 processes the instance generated based on the first class, thereby converting the Unicode CSV database into the CSV database of the character code corresponding to the model of the printer 11. In this way, the library 45 generates the database of the character code corresponding to the model of the printer 11. Accordingly, depending on the model (type) of the printer 11, the library 45 generates a database written in a character code that can be interpreted by the printer 11.

The main module 43 calls the second API 38 of the DLL provided by the OS 36, and causes the DLL to convert the character code of the CSV database created by a spreadsheet program into Unicode CSV database (S18). Then, the main module 43 hands over the Unicode CSV database to the library 45 through the common module 44. Thus, the character code of the CSV database to be inputted to the library 45 can be limited to Unicode. Accordingly, compared with a case where CSV databases written in various character codes are inputted to the library 45, the processing executed by the library 45 is reduced.

The application 37 includes the common module 44 in addition to the library 45. The application 37 generates the database of the particular format that can be inputted to the printer 11, and generates print data from image data.

Further, the library 45 is written in the C++ program language. Thus, as long as a program can hand over information and data with a program written in C++, that program can hand over information and data to the library 45 so as to use the library 45.

[Modifications]

While the disclosure has been described in detail with reference to the above aspects thereof, it would be apparent to those skilled in the art that various changes and modifications may be made therein without departing from the scope of the claims.

For example, in the above-described embodiment, the main module 43 transmits the database of the particular format (binary data) generated by the library 45 to the printer 11 through the OS 36. Alternatively, the main module 43 may store, in the data store region 35 of the memory 32, the database of the particular format (binary data) generated by the library 45 as the binary data as it is or after conversion to a file format. Further, the main module 43 may transmit the database of the particular format (binary data) generated by the library 45 to an apparatus other than the printer 11, as the binary data as it is or after conversion to a file format.

In the above-described embodiment, the DLL provided by the OS 36 converts the character code of CSV database created by the spreadsheet program into the Unicode CSV database. Alternatively, the application 37 may further include a module that converts the character code of the CSV database created by the spreadsheet program into the Unicode CSV database.

In the above-described embodiment, the library 45 generates the database of the particular format, and hands over the generated database of the particular format to the common module 44. Alternatively, the library 45 may generate the database of PD3 format (S37) and hand over the generated database of the PD3 format to the common module 44.

In the above-described embodiment, the database inputted to the application 37 is a CSV database. However, the database inputted to the application 37 is not limited to a CSV database.

In the above-described embodiment, the examples of the partial data include "local code name", "database name", "basic data", and "index data". Alternatively, the partial data may be data other than the above-mentioned data.

In the above-described embodiment, the common module 44 that generates print data instructs the library 45 to perform conversion of the data format of the database. Alternatively, the main module 43 may directly instruct the library 45 to perform conversion of the data format of the database, or may instruct the library 45 to perform conversion of the data format of the database through a module other than the common module 44.

In the above-described embodiment, the first file path indicative of the CSV database file before conversion is different from the second file path indicative of the Unicode CSV database after conversion. Similarly, in the above-described embodiment, the second file path is different from the third file path. Alternatively, the first file path and the second file path may be the same file path, and the second file path and the third file path may be the same file path. That is, the file path indicative of data before conversion may be the same as the file path indicative of data after conversion.

In the above-described embodiment, as shown in FIG. 2B, the conversion correspondence table 48 includes the correspondence among the model name (type information indicative of a printer type), the arrangement type (information identifying the structure of data after conversion), and the local code type (information identifying the character code type of the data after conversion). Alternatively, the conversion correspondence table 48 may include only the correspondence between the model name and the arrangement type. Alternatively, the conversion correspondence table 48 may include only the correspondence between the model name and the local code type.

The order of execution of the above-described steps may be changed within the scope of this disclosure. Further, each of the above-described steps may be omitted or modified within the scope of this disclosure.

What is claimed is:

1. A non-transitory computer readable storage medium storing a set of program instructions for an information processing apparatus comprising a processor, a communication interface, and a memory, the set of program instructions, when executed by the processor, causing the information processing apparatus to perform:
    acquiring a model name of a printer;
    acquiring first data having a first format, the first format being a CSV database written in Unicode;
    identifying particular information corresponding to the acquired model name based on a conversion correspondence table, the conversion correspondence table showing a correspondence between the model name and the particular information, the particular information identifying at least a structure of data after conversion or a character code type of the data after conversion;
    converting the first data into second data corresponding to the identified particular information, the second data having a second format to be inputted to the printer, the second data including as a header, a command indicative of an instruction for inputting data to the printer by one-way communication; and partial data including basic data that is binary data corresponding to the CSV database; and
    outputting the second data.

2. The non-transitory computer readable storage medium according to claim 1, wherein the particular information is indicative of the character code type of the data after conversion; and
    wherein the converting the first data includes:
        converting a first character code of the first data into a second character code, the second character code being indicated by the identified particular information; and
        converting the first data of the second character code into the second data.

3. The non-transitory computer readable storage medium according to claim 1, wherein the information processing apparatus is a mobile terminal including the communication interface.

4. The non-transitory computer readable storage medium according to claim 1, wherein the set of program instructions serves as a data generation program including a first module and a second module,
    the first module, when executed by the processor, causing the information processing apparatus to perform:
        the acquiring the model name of the printer;
        the acquiring first data having a first format;
        the identifying particular information corresponding to the acquired model name based on a conversion correspondence table, the conversion correspondence table showing a correspondence between the model name and the particular information, the particular information identifying at least a structure of data after conversion or a character code type of the data after conversion;
        the converting the first data into second data corresponding to the identified particular information, the second data having a second format to be inputted to the printer; and
        the outputting the second data,
    the second module, when executed by the processor, causing the information processing apparatus to perform:
        acquiring original data having a fourth format;
        calling an API to convert a character code of the original data into a common character code to acquire the first data, the API being provided by an OS of the information processing apparatus; and
        handing over the acquired first data to the first module.

5. The non-transitory computer readable storage medium according to claim 4, wherein the data generation program further includes a third module configured to generate print data.

6. The non-transitory computer readable storage medium according to claim 4, wherein the data generation program further includes a fourth module;
    wherein the second module includes an another API called by the fourth module; and
    wherein the fourth module, when executed by the processor, causes the information processing apparatus to perform:
        calling the another API and handing over the original data to the second module.

7. A non-transitory computer readable storage medium storing a set of program instructions for an information processing apparatus comprising a processor, a communication interface, and a memory, the set of program instructions, when executed by the processor, causing the information processing apparatus to perform:
    acquiring type information indicative of a printer type;
    acquiring first data having a first format;
    identifying particular information corresponding to the acquired type information based on a conversion correspondence table, the conversion correspondence table showing a correspondence between the type information and the particular information, the particular information identifying at least a structure of data after conversion or a character code type of the data after conversion;
    converting the first data into second data corresponding to the identified particular information, the second data having a second format to be inputted to the printer; and outputting the second data,
wherein the particular information is indicative of the structure of the data after conversion;
wherein the structure of the data is indicative of arrangement positions of a plurality of partial data included in the first data; and
wherein the converting the first data includes:
arranging the plurality of partial data at the arrangement positions indicated by the identified particular information; and
converting the arranged plurality of partial data into the second data.

8. The non-transitory computer readable storage medium according to claim 7, wherein the set of program instructions includes an API configured to convert the first data into the second data.

9. The non-transitory computer readable storage medium according to claim 7, wherein the arrangement positions of the plurality of partial data are the arrangement positions of basic data that is binary data corresponding to a database included in the first data, a name of a local code that is a character code that is interpreted by the printer, a database name written in the local code, and index data of the database.

10. A non-transitory computer readable storage medium storing a set of program instructions for an information processing apparatus comprising a processor, a communication interface, and a memory, the set of program instructions, when executed by the processor, causing the information processing apparatus to perform:
acquiring type information indicative of a printer type;
acquiring first data having a first format;
identifying particular information corresponding to the acquired type information based on a conversion correspondence table, the conversion correspondence table showing a correspondence between the type information and the particular information, the particular information identifying at least a structure of data after conversion or a character code type of the data after conversion;
converting the first data into second data corresponding to the identified particular information, the second data having a second format to be inputted to the printer; and
outputting the second data,
wherein the particular information is indicative of both the structure of the data after conversion and the character code type of the data after conversion;
wherein the structure of the data is indicative of arrangement positions of a plurality of partial data included in the first data;
wherein the converting the first data includes:
converting a first character code of the first data into a second character code, the second character code being indicated by the identified particular information;
arranging the plurality of partial data at the arrangement positions indicated by the particular information, thereby generating third data having a third format;
converting the arranged plurality of partial data into the second data; and
wherein the set of program instructions includes an API configured to convert the first data into the second data.

11. The non-transitory computer readable storage medium according to claim 10, wherein the third data includes a command for instructing two-way communication between the information processing apparatus and the printer; and
wherein the second data includes a command for instructing one-way communication from the information processing apparatus to the printer.

* * * * *